US010926329B2

(12) United States Patent
Corsmeier (10) Patent No.: US 10,926,329 B2
(45) Date of Patent: Feb. 23, 2021

(54) METHODS AND APPARATUSES TO GROW COMPRESSION CHAMBERS IN POWDER BASED ADDITIVE MANUFACTURING TO RELIEVE POWDER LOADING ON GROWN PART

(71) Applicant: GENERAL ELECTRIC COMPANY, Schenectady, NY (US)

(72) Inventor: Donald Michael Corsmeier, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 752 days.

(21) Appl. No.: 15/610,205

(22) Filed: May 31, 2017

(65) Prior Publication Data
US 2018/0345372 A1 Dec. 6, 2018

(51) Int. Cl.
| | | |
|---|---|---|
| *B22F 3/105* | (2006.01) | |
| *B33Y 10/00* | (2015.01) | |
| *B33Y 30/00* | (2015.01) | |
| *B33Y 40/00* | (2020.01) | |
| *B23K 26/342* | (2014.01) | |
| *B23K 26/16* | (2006.01) | |

(Continued)

(52) U.S. Cl.
CPC ............ *B22F 3/1055* (2013.01); *B33Y 10/00* (2014.12); *B33Y 30/00* (2014.12); *B33Y 40/00* (2014.12); *B22F 5/10* (2013.01); *B22F 2003/1058* (2013.01); *B22F 2003/1059* (2013.01); *B33Y 80/00* (2014.12)

(58) Field of Classification Search
None
See application file for complete search history.

(56) References Cited

U.S. PATENT DOCUMENTS

| | | | |
|---|---|---|---|
| 4,863,538 A | 9/1989 | Deckard | |
| 5,460,758 A | 10/1995 | Langer et al. | |

(Continued)

FOREIGN PATENT DOCUMENTS

EP 1521657 B1 11/2006

OTHER PUBLICATIONS

"Chapter 5: Powder Bed Fusion Processes." Additive Manufacturing Technologies, by Ian Gibson, Springer, 2010. (Year: 2010).*

*Primary Examiner* — Colleen P Dunn
*Assistant Examiner* — Anthony M Liang
(74) *Attorney, Agent, or Firm* — Dority & Manning, P.A.

(57) ABSTRACT

The present disclosure generally relates to methods and apparatuses for additive manufacturing (AM) that utilize compression chambers to reduce pressure on grown objects. In one aspect, the disclosure provides a method for fabricating an object. The method includes (a) irradiating a layer of powder in a build area above a build platform to form a fused region; (b) providing a subsequent layer of powder over the build area; and (c) repeating steps (a) and (b) until at least a portion of the object, at least one chamber, and a tube are formed in the build area. The chamber encloses a region of unfused powder and the tube extends from a passage within the build platform to the chamber. The method also includes (d) removing unfused powder from within the chamber via the tube and the passage. The disclosure also provides an apparatus for forming compression chambers within an object.

14 Claims, 6 Drawing Sheets

(51) Int. Cl.
  *B33Y 80/00*  (2015.01)
  *B22F 5/10*  (2006.01)

(56)  References Cited

U.S. PATENT DOCUMENTS

| | | | |
|---|---|---|---|
| 5,490,882 A * | 2/1996 | Sachs | ................ B08B 3/10 |
| | | | 134/1 |
| 5,640,667 A | 6/1997 | Freitag et al. | |
| 9,079,248 B2 | 7/2015 | Ackelid | |
| 9,254,535 B2 | 2/2016 | Buller et al. | |
| 9,327,450 B2 | 5/2016 | Hein et al. | |
| 9,457,514 B2 | 10/2016 | Schwaerzler | |
| 9,533,452 B2 | 1/2017 | Guenster et al. | |
| 2011/0247590 A1 | 10/2011 | Donovan | |
| 2015/0239046 A1 | 8/2015 | McMahan et al. | |
| 2016/0221084 A1 | 8/2016 | Klecka et al. | |
| 2017/0021420 A1 | 1/2017 | Buller et al. | |

\* cited by examiner

PRIOR ART

METHODS AND APPARATUSES TO GROW COMPRESSION CHAMBERS IN POWDER BASED ADDITIVE MANUFACTURING TO RELIEVE POWDER LOADING ON GROWN PART

INTRODUCTION

The present disclosure generally relates to methods for additive manufacturing (AM) that fuse powder in the process of building objects, as well as novel compression chambers to be used within these AM processes.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

Figure 1:
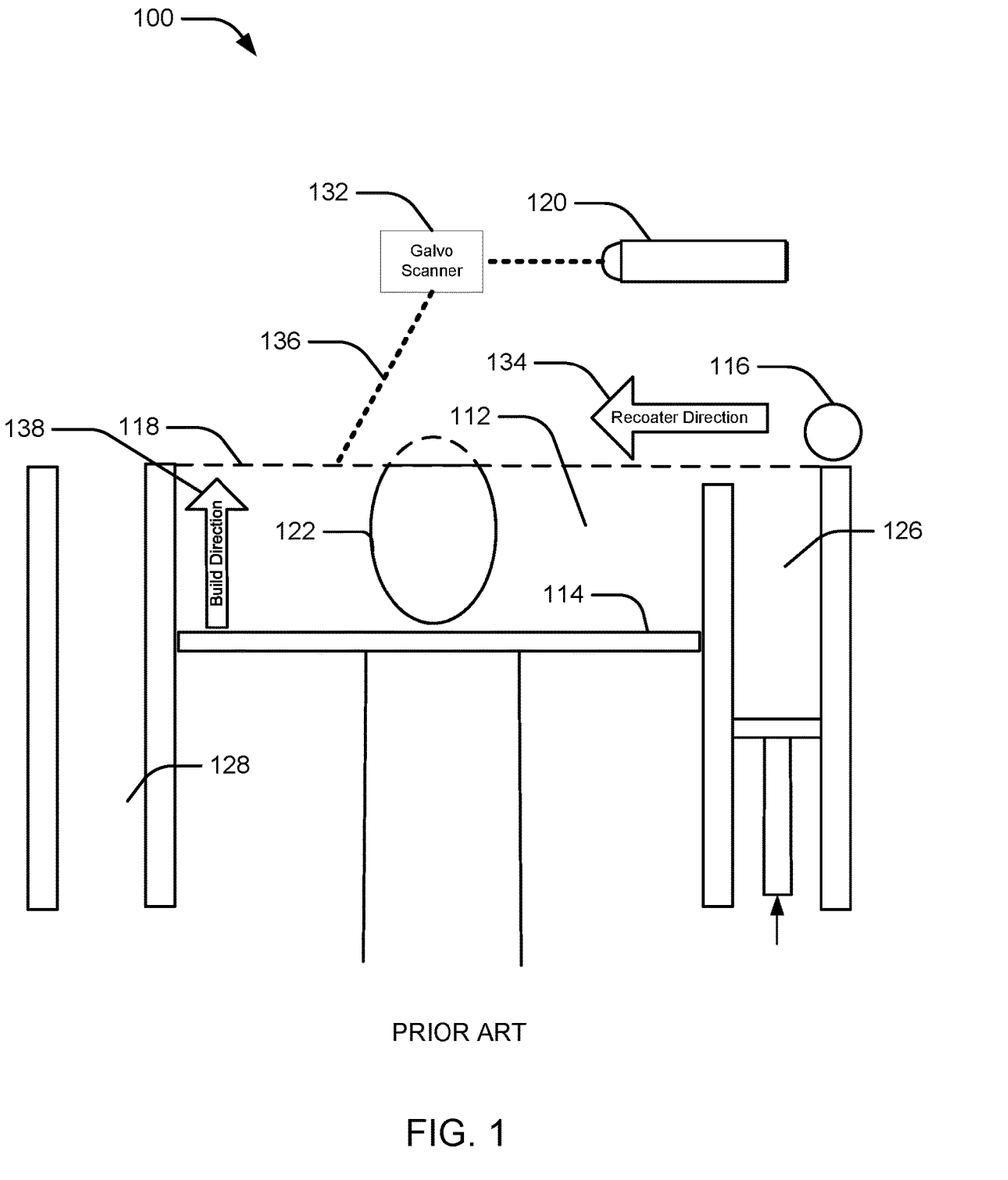
FIG. 1 is schematic diagram showing an example of a conventional apparatus for additive manufacturing.

FIG. 1 is schematic diagram showing a cross-sectional view of an exemplary conventional system 100 for direct metal laser sintering (DMLS) or direct metal laser melting (DMLM). The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of unfused powder by, for example, blowing or vacuuming. Other post processing procedures include a stress release process. Additionally, mechanical, thermal, and chemical post processing procedures can be used to finish the part 122.

EP1521657 discloses a metal workpiece consisting of a pre-manufactured lower part and an upper piece which is placed thereon using a metal powder sintering process. Both the pre-manufactured lower part and the upper piece include cooling passages, which may be used to cool the workpiece during an injection molding process.

The present inventors have discovered that additive manufacturing techniques may be used to create objects, support structures, or combinations thereof that define enclosed spaces. The enclosed spaces may retain powder. As the objects cool, thermal contraction may cause the object to compress the retained powder One possible effect is that the retained powder may not compress, and the cooling object may crack or develop other structural weaknesses. Another possible effect is that the retained powder may become impacted and more difficult to remove during post-processing operations.

In view of the above, it can be appreciated that there are problems, shortcomings or disadvantages associated with AM techniques, and that it would be desirable if improved methods and apparatuses for managing thermal contraction during additive manufacturing were available.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a method for fabricating an object. The method includes (a) irradiating a layer of powder in a build area above a build platform to form a fused region; (b) providing a subsequent layer of powder over the build area; and (c) repeating steps (a) and (b) until at least a portion of the object, at least one chamber, and a tube are formed in the build area. The chamber encloses a region of unfused powder and the tube extends from a passage within the build platform to the chamber. The method also includes (d) removing unfused powder from within the chamber via the tube and the passage.

An apparatus for fabricating an object from metal powder. The apparatus includes a build unit including a powder delivery unit, a recoater arm, and an energy beam directing device. The apparatus includes a base plate having a passage there through. The apparatus includes a valve coupled to the passage configured to selectively open and close the passage.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Figure 2:
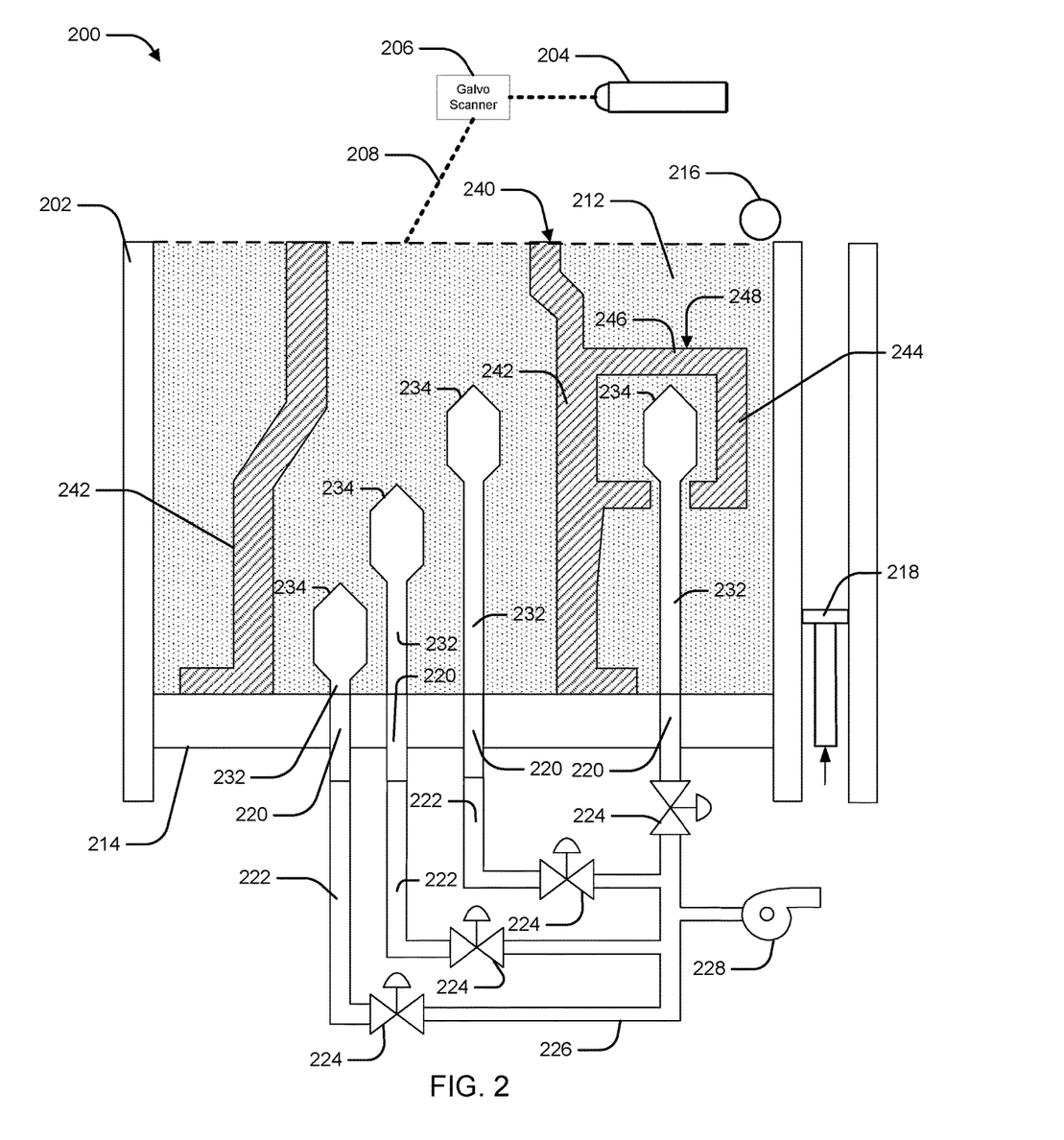
FIG. 2 is a schematic diagram showing an example of an apparatus including passages connected to compression chambers, in accordance with aspects of the present invention.
Figure 3:
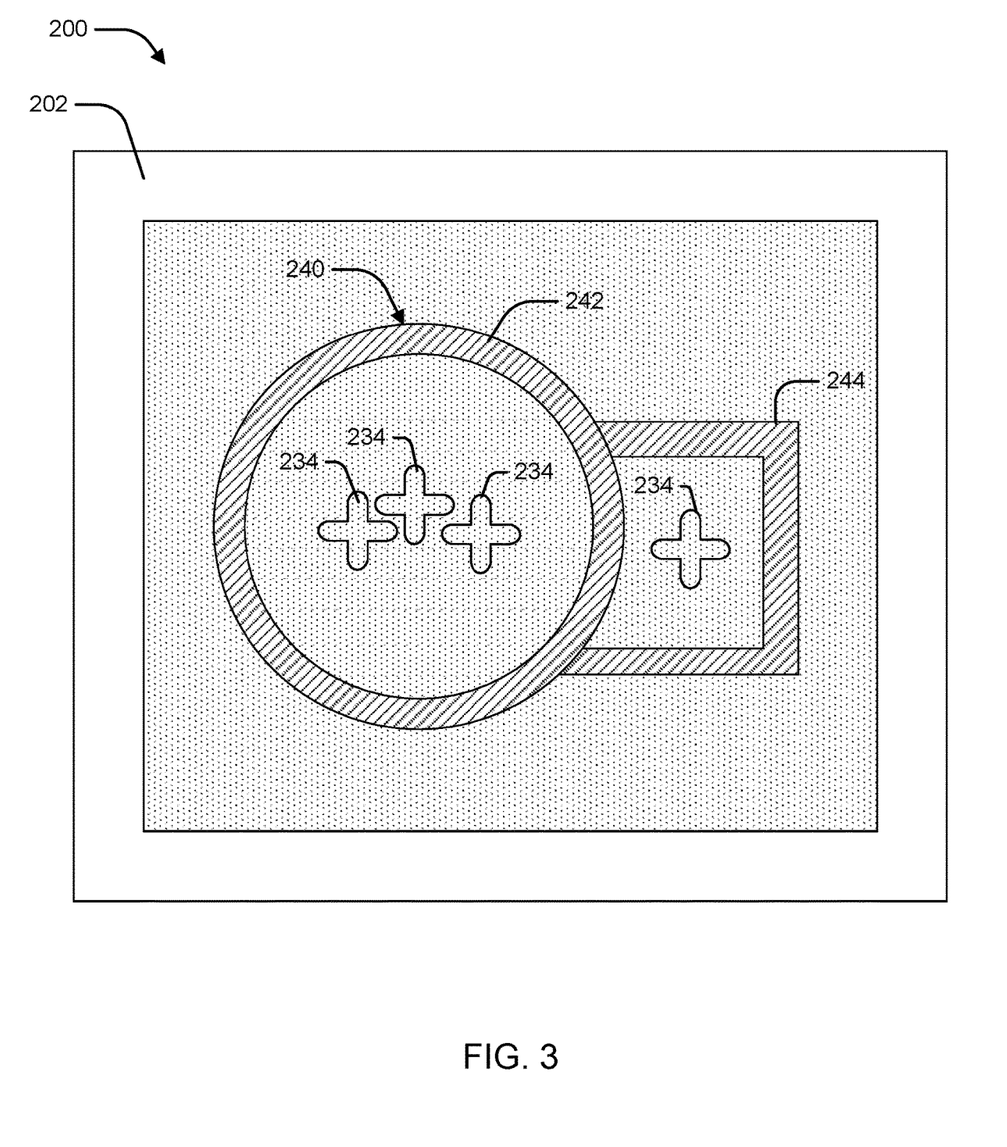
FIG. 3 illustrates plan view of the apparatus of FIG. 2.

Turning now to the figures, FIGS. 2 and 3 illustrate an example of an apparatus 200 including passages 220 connected to compression chambers 234. FIG. 2 illustrates a vertical cross-section of the apparatus 200. FIG. 3 illustrates horizontal cross-section of the apparatus 200. The apparatus 200 is an additive manufacturing apparatus for forming an object from a metal powder. The apparatus 200 may be similar to the conventional apparatus 100 in that the apparatus 200 includes an energy beam emitter 204, a powder delivery unit 218, a recoater arm 216, and an energy beam directing device 206. The energy beam emitter 204 may be, for example, a laser or an electron beam (e-beam) generator. The energy beam directing device 206 may be a galvo scanner.

As illustrated the apparatus 200 includes walls 202 that retain powder 212 above a base plate 214. In an aspect, the walls 202 may form a fixed powder bin, and the base plate 214 may move within the powder bin in a similar manner as the build platform 114. The powder delivery unit 218 may be similar to the reservoir 126, and the recoater arm 216 may spread the powder similarly to the recoater 116. In another aspect, the walls 202 may be a dynamically built build envelope into which powder is dispensed by the powder delivery unit 218 (e.g., a hopper) to bring the powder 212 to the height of the walls 202. The base plate 214 may be fixed and a build unit including the energy beam emitter 204, powder delivery unit, recoater arm 216, and energy beam directing device 206 may be moved upward as the object 240 is built.

The base plate 214 includes passages 220 for removing unfused powder during a build operation. The passages 220 are coupled to respective valves 224, for example, via tubing 222. The valves 224 are also coupled to a vacuum source 228, for example, via vacuum lines 226. Before a build operation begins, the valves 224 are closed and the passages 220 are filed with powder to a top surface of the base plate 214. Accordingly, at the start of the build operation, powder may be dispensed over a flat surface.

The object 240 is formed by selectively melting or sintering the powder 212 in a layer by layer manner. The object 240 includes a main portion including wall 242 that defines a generally cylindrical shape having varying diameter. The wall 242 encloses a portion of powder at least in a horizontal plane. As the object 240 including the wall 242 cools, the wall 242 may contract, compressing the enclosed portion of powder radially inward. In some cases, where the enclosed portion of powder is not compressible, the stress on the wall 242 may cause cracking or other structural weaknesses in the object 240. The object 240 also includes an outer portion 248 defined between the wall 242, a wall 244, and a horizontal ceiling 246 enclosing a portion of powder. As the wall 242, wall 244, and ceiling 246 cool, the enclosed portion of powder may be compressed both horizontally and vertically. Once again, compression of uncompressible powder may result in cracking or other structural weaknesses of the outer portion 248.

Compression chambers 234 are formed by the apparatus 200 in a similar manner as the object 240. Generally, the compression chambers 234 are a thin walled structure enclosing unfused powder. For example, the thin walls may be a minimum thickness allowed by the apparatus 200 based on a beam width and/or support requirements. For example, the walls of compression chambers 234 may be approximately 10-20 mils thick. Each compression chamber 234 is connected to a tube 232, which in turn is connected to a passage 220. The tubes 232 are formed by selectively fusing a cross-section (e.g., a circle) of powder around the passage 220 in each layer above the base plate 214 until the bottom of the compression chamber 234. The compression chamber 234 may expand outward from the tube 232 to enclose a larger volume of powder. The powder enclosed by a compression chamber 234 is removed by opening the respective valve 224. Vacuum may also be applied by the vacuum source 228. As the powder is removed, the compression chamber 234 may be compressed by pressure from the unfused powder external to the compression chamber 234 (which may be compressed by a thermally contracting wall 242, 244 or ceiling 246. Accordingly, the compression chambers 234 may be selectively emptied in order to reduce pressure within the object 240.

As illustrated, the apparatus 200 includes four passages 220 connected to respective compression chambers 234. The compression chambers 234 may be strategically located to relieve pressure at desired locations at desired points during a build operation. For example, three compression chambers 234 are located within the wall 242 at varying heights. The valves 224 coupled to the compression chambers may be opened sequentially as the level of the powder 212 exceeds the height of the respective compression chamber and/or after the compression chamber 234 is completed. In another aspect, opening of the valves 224 may be delayed until a horizontal ceiling is formed above the compression chamber 234 such that removal of powder will not affect the top layer of powder.

Figure 4:
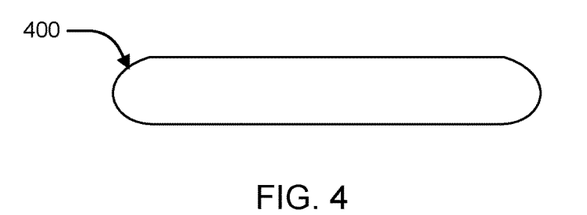
FIG. 4 illustrates a first example cross-sectional shape of a chamber.

FIG. 4 illustrates a first example cross-sectional shape 400 of a chamber 234. The shape 400 may be an oval. The oval shape may allow the chamber 234 to compress in a desired direction (e.g., the short axis of the oval) while maintaining another dimension (e.g., the long axis of the oval). Accordingly, the shape 400 may allow relief of pressure in a desired direction.

Figure 5:
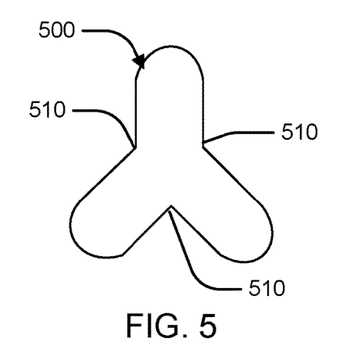
FIG. 5 illustrates a second example cross-sectional shape of a chamber.

FIG. 5 illustrates a second example cross-sectional shape 500 of a chamber 234. The shape 500 includes three internal corners 510. When the internal powder is removed from the shape 500, the external pressure may cause the shape 500 to fold at the internal corners 510 thereby allowing significant reduction in volume in multiple directions.

Figure 6:
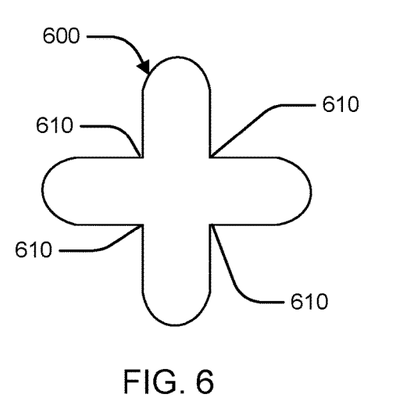
FIG. 6 illustrates a third example cross-sectional shape of a chamber.

FIG. 6 illustrates a third example cross-sectional shape 600 of a chamber 234. The shape 600 includes four internal corners 610. When the internal powder is removed from the shape 600, the external pressure may cause the shape 600 to fold at the internal corners 610 thereby allowing significant reduction in volume in multiple directions.

Figure 7:
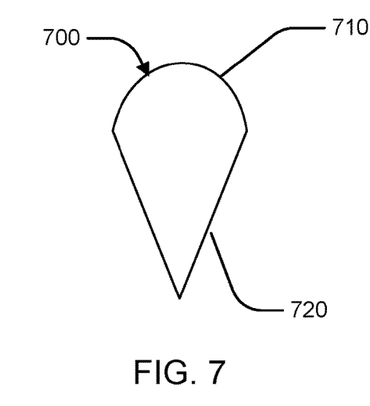
FIG. 7 illustrates a fourth example cross-sectional shape of a chamber.

FIG. 7 illustrates a fourth example cross-sectional shape 700 of a chamber 234. The shape 700 includes a semicircular portion 710 and an angled portion 720. The shape 700 may be relatively resistant to compression. Accordingly, the shape 700 may provide gradual compression to keep a total pressure below a threshold without creating a sudden drop in pressure.

Figure 8:
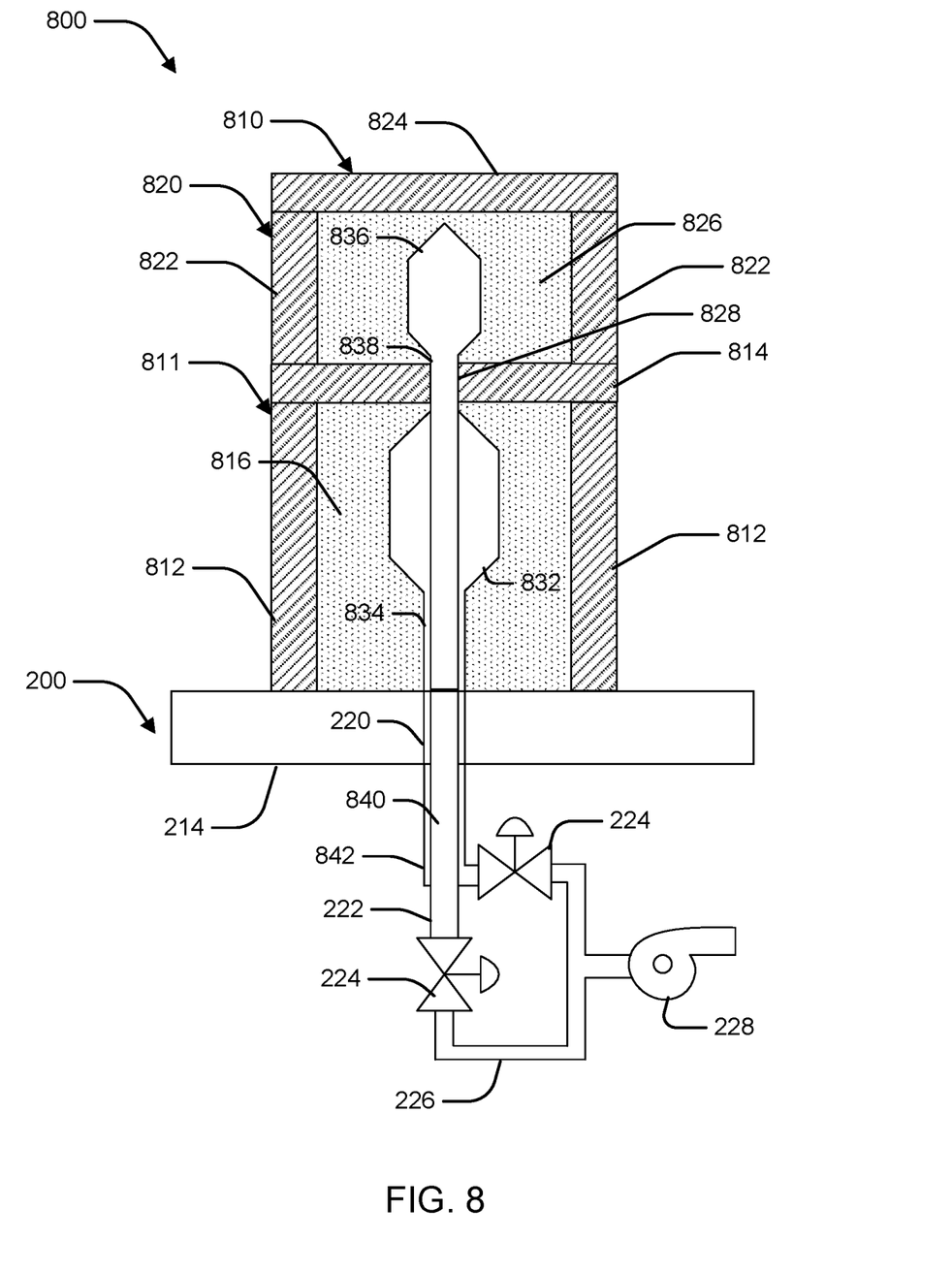
FIG. 8 illustrates an example of compression chambers using nested tubes, in accordance with aspects of the present invention.

FIG. 8 illustrates an example build environment 800 including an object 810 built using the apparatus 200. For simplicity, components of the apparatus 200 above the base plate 214 are not shown. The object 810 includes a bottom portion 811 and a top portion 820. The bottom portion 811 has a wall 812 and a horizontal ceiling 814 defining an enclosed region 816. A compression chamber 832 is formed within the enclosed region 816 and is connected by a tube 834 to the passage 220. The top portion 820 also has a wall 822 and horizontal ceiling 824 defining an enclosed region 826. The horizontal ceiling 814 includes a passage 828 connecting the enclosed region 816 and the enclosed region 826. A compression chamber 836 is formed within the enclosed region 826. A tube 838 extends from the compression chamber 836 through the passage 828, the compression chamber 832, and the tube 834 to the passage 220. That is, the tube 838 is nested within the tube 834 such that two lumens are formed in communication with the compression chamber 832 and the compression chamber 836. The passage 220 includes an internal pipe 840. The internal pipe 840 passes out of the passage 220 at a Y-connector 842. The internal pipe 840 and the passage 220 are connected to respective valves 224, which in turn are connected to the vacuum source 228 via the vacuum lines 226.

In operation, as the object 810 is built vertically, the compression chamber 832 is completed first. After the horizontal ceiling 824 is formed and begins to cool, thermal contraction may increase pressure in the enclosed region 816. The compression chamber 832 may be compressed by opening the respective valve 224 and vacuuming out the powder retained in the compression chamber 832. Because the horizontal ceiling 814 vertically encloses the region 816, even if removal of the powder causes the powder in the region 816 to have a smaller volume than the region 816, the powder in region 826 may be supported by the horizontal ceiling 814. Because the tube 838 is connected to a separate valve 224, the powder in the region 826 should not be affected. The compression chamber 836 may be emptied once the horizontal ceiling 824 is formed.

Figure 9:
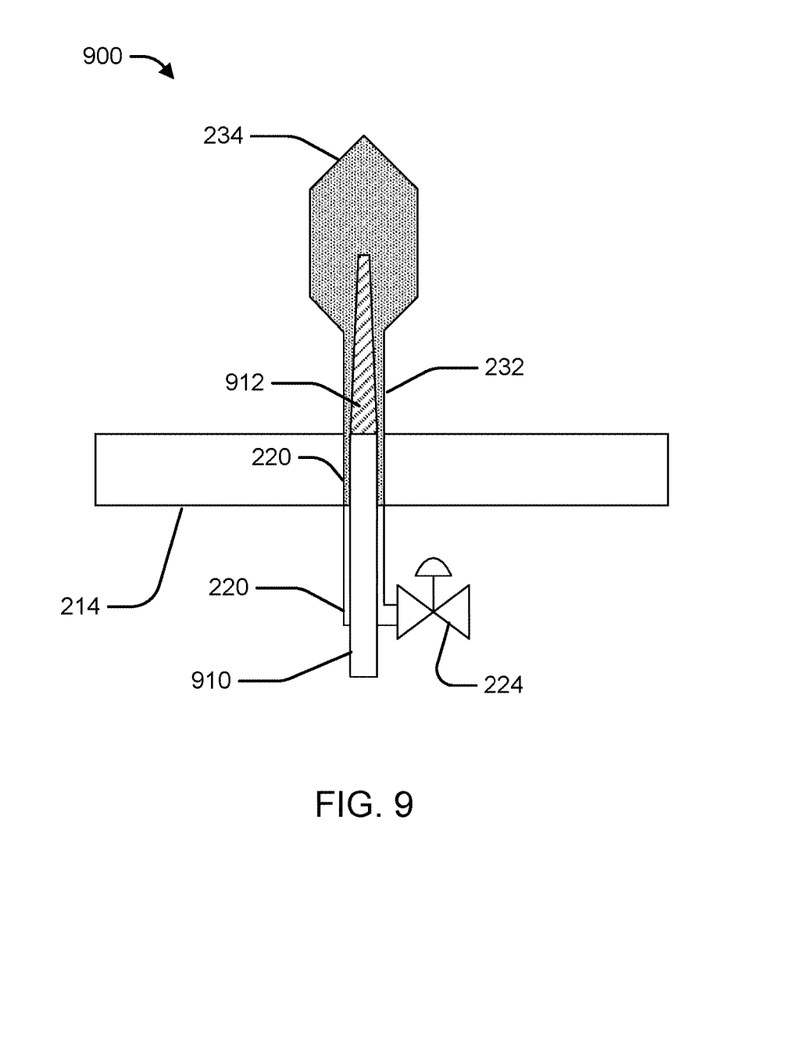
FIG. 9 illustrates an example of an apparatus including a rod for relieving pressure on impacted powder in accordance with aspects of the present invention.

FIG. 9 illustrates an example of an apparatus 900 including a rod 910 for relieving pressure on impacted powder within a compression chamber 234. Because a compression chamber 234 is formed of melted or sintered metal powder, the compression chamber 234 may also be subject to thermal contraction. Although the compression chamber 234 is generally flexible due to the thin walls, the thermal contraction may cause the retained powder to become impacted. Vacuum alone may be insufficient to remove impacted powder from the compression chamber 234.

The apparatus 900 may include a rod 910 extending through the passage 220. Initially, the rod may extend to the top surface of the base plate 214. The rod 910 may pass through the tubing 222 at a bend. During the build operation, the rod 910 may be extended by forming an extension 912 on top of the rod 910 and within the tube 232. For example, in one layer, a solid circular cross-section of the extension 912 may be fused within a annular cross-section of the tube 232. Similarly, the extension 912 may be formed to extend within the chamber 234.

Figure 10:
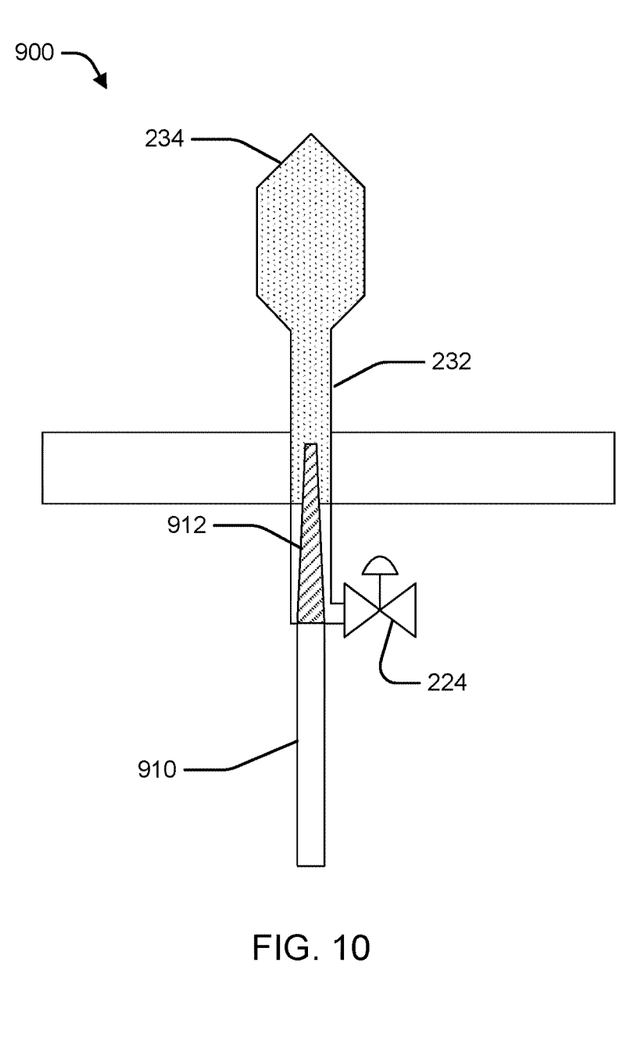
FIG. 10 illustrates the apparatus of FIG. 9 with the rod being retracted in accordance with aspects of the present invention.

In order to remove the unfused powder from the chamber 234, the rod 910 may be retracted as illustrated in FIG. 10. The extension 912 is fused to the rod 910 and is also retracted. The impacted powder may be loosened by the withdrawal of the extension 912. The valve 224 is then opened to remove the unfused powder within the compression chamber 234. The compression chamber 234 may then be compressed by the pressure of external powder.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:
1. A method for fabricating an object, comprising:
(a) irradiating a layer of powder in a build area above a build platform to form a fused region;
(b) providing a subsequent layer of powder over the build area; and

(c) repeating steps (a) and (b) until at least a portion of the object, at least one chamber, and a tube are formed in the build area, wherein the at least one chamber encloses a chamber unfused powder and the tube extends from a passage within the build platform to the at least one chamber; and (d) removing the chamber unfused powder from within the at least one chamber via the tube and the passage.

2. The method of claim 1, further comprising repeating steps (a) and (b) after step (d).

3. The method of claim 1, wherein the at least one chamber is compressible.

4. The method of claim 1, wherein step (d) comprises opening a valve that retains the chamber unfused powder within the passage.

5. The method of claim 4, wherein step (d) comprises vacuuming the chamber unfused powder from the passage.

6. The method of claim 1, wherein by repeating steps (a) and (b) a rod is formed within at least the tube, the rod extending from a stub within the passage, wherein step (d) comprises removing the rod extending within the tube.

7. The method of claim 1, wherein the object includes a wall that encloses along a horizontal direction parallel to the build platform an object unfused powder within the object, and wherein the at least one chamber is located within the object unfused powder.

8. The method of claim 7, wherein step (d) is performed after the wall encloses the object unfused powder within the object.

9. The method of claim 8, wherein the object includes a horizontal ceiling connected to the wall that at least partially encloses along a vertical direction perpendicular to the build platform the object unfused powder.

10. The method of claim 1, wherein the at least one chamber includes multiple chambers formed at different heights above the build platform.

11. The method of claim 10, wherein step (d) includes removing the chamber unfused powder from a respective chamber of the multiple chambers after a level of object unfused powder exceeds a respective height of the respective chamber.

12. The method of claim 10, wherein step (d) includes removing chamber unfused powder from a respective chamber of the multiple chambers after forming a horizontal ceiling above the respective chamber.

13. The method of claim 10, wherein a first tube connected to a first chamber of the multiple chambers is internal to a second tube connected to a second chamber.

14. The method of claim 13, wherein the first tube passes through the second chamber.

* * * * *